(12) United States Patent
Halberstadt

(10) Patent No.: US 8,441,816 B2
(45) Date of Patent: May 14, 2013

(54) CONTROLLER FOR A SWITCHED MODE POWER SUPPLY (SMPS), A SMPS, AND A METHOD OF CONTROLLING A SMPS

(75) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 299 days.

(21) Appl. No.: 12/946,761

(22) Filed: Nov. 15, 2010

(65) Prior Publication Data
US 2011/0280051 A1    Nov. 17, 2011

(30) Foreign Application Priority Data
Oct. 16, 2009   (EP) ..................................... 09176055

(51) Int. Cl.
*H02M 3/335*    (2006.01)
(52) U.S. Cl.
USPC ............... 363/21.15; 363/21.07; 363/21.09; 363/21.17
(58) Field of Classification Search ............... 363/21.04, 363/21.05, 21.06, 21.07, 21.08, 21.09, 31.12, 363/21.13, 21.14, 21.15, 21.17
See application file for complete search history.

(56) References Cited

U.S. PATENT DOCUMENTS

| | | | | |
|---|---|---|---|---|
| 6,122,180 A | * | 9/2000 | Seo et al. | 363/21.17 |
| 7,881,077 B2 | * | 2/2011 | Hsu | 363/21.12 |
| 2005/0111242 A1 | * | 5/2005 | Oh | 363/21.07 |
| 2006/0044845 A1 | | 3/2006 | Fahlenkamp et al. | |
| 2006/0093017 A1 | | 5/2006 | Gong et al. | |
| 2009/0021233 A1 | | 1/2009 | Hsu | |
| 2009/0129129 A1 | * | 5/2009 | Udagawa | 363/52 |

OTHER PUBLICATIONS

European Search Report, 09176055, Apr. 20, 2010.

* cited by examiner

*Primary Examiner* — Nguyen Tran

(57) ABSTRACT

According to an example embodiment, a controller for a Switched Mode Power Supply having opto-coupler-based feedback from secondary to primary side, is disclosed, in which the optocoupler current varies inversely with the output voltage over a voltage control range. The converter is thereby enabled to consume less power than do conventional converters, when in lower-power standby mode. Also disclosed are low-voltage startup and over-voltage protection arrangements combined with such a controller. Corresponding methods are also disclosed.

15 Claims, 4 Drawing Sheets

CONTROLLER FOR A SWITCHED MODE POWER SUPPLY (SMPS), A SMPS, AND A METHOD OF CONTROLLING A SMPS

This application claims the priority under 35 U.S.C. §119 of European patent application no. 09176055.3, filed on Nov. 16, 2009, the contents of which are incorporated by reference herein.

FIELD OF THE INVENTION

This invention relates to switched mode power supplies (SMPSs), to controllers therefore and to methods of controlling SMPSs.

BACKGROUND OF THE INVENTION

Switched mode power converters, in particular but not limited to AC-DC converters, typically employ feedback from the secondary to the primary side in order to control the power of the converter. For many applications, however, electrical isolation is required between the two sides, typically in order to protect the user on the secondary side from relatively high voltages on the primary side (such as mains voltages). For such applications, an optocoupler is a preferred means to provide the feedback across the isolation, since feedback information is transferred from the electrical domain to an optical domain and back.

In known feedback systems, the optocoupler is used to transfer an error signal (Vout−Voutref), indicative of the difference between the actual output voltage (Vout) and the desired output voltage (Voutref). The feedback current on the output side of the optocoupler (that is to say on the primary side of the converter), increases typically linearly with the error signal, as shown schematically in FIG. 1, which shows a plot of the output current (Iopto) 10 from the optocoupler, against the converter output voltage (Vout). The feedback current Iopto is typically directly related to the input current (Ioptin) driving the optocoupler (that is to say, on the secondary side of the optocoupler)—for instance, the feedback current Iopto may be directly proportional to the input current (Ioptin), through a gain factor g. In some implementations, for converter voltages below or equal to Voutref, the feedback current is zero, whilst above Voutref the current increases linearly with the error signal (Vout−Voutref). Further, the error loop may include frequency-dependant elements for implementing integrating and/or differentiating actions.

European patent application EPA1,648080 discloses a controller in which a feedback signal rises in inverse proportion to the output voltage.

Under low-power, or no load, conditions the current required by the optocoupler to feedback the error signal can be relatively high. In particular to increase converter efficiencies at low load, there is an ongoing desire to reduce the power consumption in the feedback mechanism.

SUMMARY OF THE INVENTION

According to a first aspect of the present invention, there is provided a controller configured to control a switched mode power converter, the switched mode power converter having a primary side, a secondary side isolated therefrom and for providing an output voltage, and an optocoupler therebetween for providing feedback information to the primary side from the secondary side and drawing, in use, a feedback current from the secondary side, wherein the feedback information is dependant on the output voltage and the controller is configured to provide that the feedback current monotonically decreases with increasing output voltage between a threshold voltage and at least an upper bound. Of course, it will be appreciated that a monotonically decreasing function may be flat, or invariant, over part of its domain. Thus the optocoupler may consume less power, in a standby mode, than in conventional arrangements.

The controller is configured such that the feedback current is invariant with the output voltage between the threshold voltage and a reference voltage (Voutref), which reference voltage is higher than the threshold voltage. In these embodiments, the feedback current falls only over an upper part of the range of output-voltage between the threshold voltage and the upper bound. In other embodiments, the feedback current falls over the lower part of the range, but across this lower part of the range, the feedback current is still sufficiently high to request maximum output power. In some embodiments the controller is configured such that the feedback current either is inversely proportional to the output voltage above the reference voltage (Voutref) or decreases linearly with increasing output voltage above the reference voltage (Voutref).

In embodiments, the controller is configured to receive a signal (Voutprim) from the primary side indicative the output voltage (Vout), and wherein the controller is further configured to override the feedback information from the optocoupler with the signal (Voutprim) when the output voltage is less than the threshold voltage.

In embodiments the controller is configured to provide an over-voltage feedback current in the case that the output voltage is above the upper bound.

In some embodiments the controller further comprises a timer for triggering the over-voltage feedback current only after a predetermined time has elapsed.

In embodiments the controller is configured to provide a minimum feedback current, in the case that the output voltage is above the upper bound. In embodiments the controller is configured to override the feedback information from the optocoupler in the case that the feedback information is less than a predetermined threshold current which is less than the minimum feedback current.

According to another aspect of the present invention, there is provided a switched mode power converter comprising a controller mentioned above.

According to another aspect of the present invention, there is provided a method of controlling a switched mode power converter having a primary side, a secondary side isolated therefrom and for providing an output voltage, and an optocoupler therebetween for providing feedback information and drawing, in use, a feedback current from the secondary side, the method comprising providing feedback information to the primary side from the secondary side dependant on the output voltage and generating the feedback current such that it monotonically decreases with increasing output voltage between a threshold voltage and at least an upper bound.

The feedback current is invariant with the output voltage between the threshold voltage and a reference voltage (Voutref). Thus, the feedback current may have, in part, a flat profile, which does not change as the output voltage changes.

In embodiments the feedback current either varies in inverse proportion to the output voltage above the reference voltage (Voutref) or decreases linearly with increasing output voltage above the reference voltage (Voutref).

In embodiments of the invention, the method further comprises measuring a signal (Voutprim) on the primary side indicative the output voltage (Vout), and overriding the feedback information from the optocoupler with the signal in the case that the output voltage is less than the threshold voltage.

In embodiments the controller provides an over-voltage feedback current in the case that the output voltage is above the upper bound. In embodiments the over-voltage feedback current is triggered only once the output voltage has been above the upper bound for a predetermined period.

In embodiments the feedback current is set to a minimum value (10f, in the case that the output voltage is above the upper bound. In embodiments the controller overrides the feedback information from the optocoupler, in the case that the feedback information is less than a predetermined threshold value which is less than the minimum current value (10f).

According to a further aspect of the present invention, there is provided a computer program, which when run on a computer, causes the computer to configure a controller as described above, or to operate a method as described above.

These and other aspects of the invention will be apparent from, and elucidated with reference to, the embodiments described hereinafter.

BRIEF DESCRIPTION OF THE DRAWINGS

Embodiments of the invention will be described, by way of example only, with reference to the drawings, in which.

Figure 1:
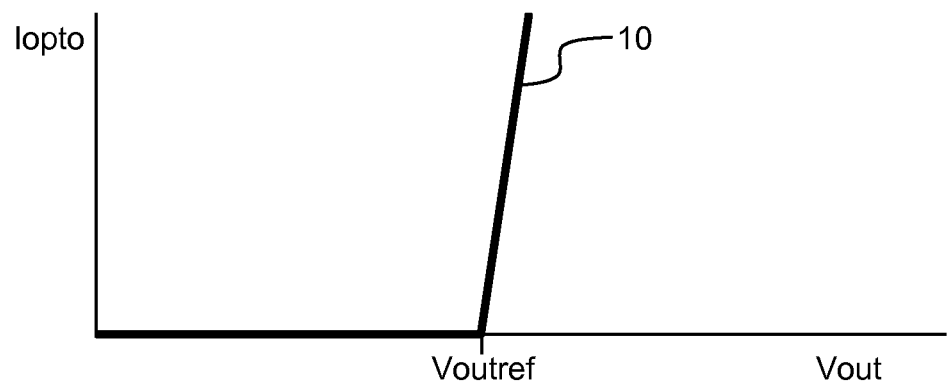
FIG. 1 shows a graph of optocoupler current against output voltage according to known converters.

It should be noted that the figure are diagrammatic and not drawn to scale. Relative dimensions and proportions of parts of these figure have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

As shown in FIG. 1, conventional arrangements of the feedback circuitry provides that a higher value of the output voltage results in a higher value of the optocoupler output current (hereinafter also referred to as the feedback current); the high opto-current is evaluated by the controller to be a request for lower power, and the converter is controlled in order to reduce the output power. Conversely, a low feedback current is evaluated by the controller to be a request for higher power, so the converter is adjusted in order to increase the output power. One important reason to choose this arrangement is to ensure reliable start up: at a low output voltage, the secondary circuit is not supplied with a sufficiently high supply voltage to drive the optocoupler, resulting in zero feedback current. As zero feedback current is a low current, this is interpreted by the controller as a request for higher power, so the power is increased—resulting in reliable start-up.

However, this can result in undesirable power consumption during standby mode, when the load is extremely low. Standby mode can exist for significant periods for systems such as power adaptors. In standby mode, the output voltage remains high, even though only low power is drawn. Due to the output voltage being maintained during this operation, the opto-coupler continues to draw high input current, which can result in a power consumption on the secondary side typically of the order 50 to 100 mW. Moreover, since this power has to be supplied by the primary side, there is a further power loss due to the less-than-unity conversion efficiency of any converter; thus, the situation is even worse, and the optocoupler's drain on the input power can be typically 60 to 200 mW.

Figure 2:
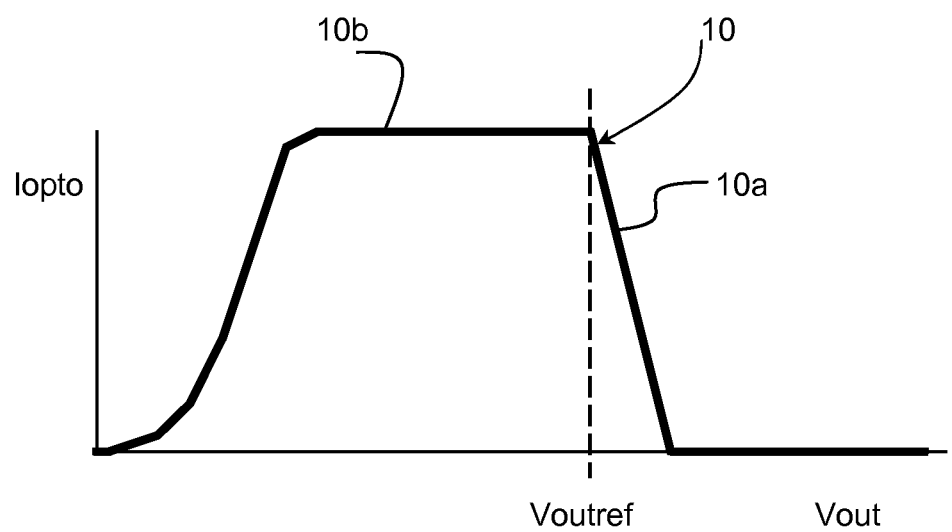
FIG. 2 shows a graph of optocoupler current against output voltage according to embodiments of the invention.

In order to reduce the loss due to the optocoupler under no load, or standby, conditions, it is thus desirable to "invert" the operation of the optocoupler, as shown figuratively in FIG. 2; then, for increasing output voltage (Vout) above the reference voltage (Voutref), the current drawn by the optocoupler decreases. FIG. 2 shows the optocoupler current 10 against output voltage according to embodiments of the invention. For voltages greater than the reference voltage Voutref the current 10a decreases with increasing voltage. In the embodiment shown, the decrease is linear with the error (Vout−Voutref); however, other relationships such as quadratic or reciprocal could also be used. In general terms, provided the derivative d(Iopto)/d(Vout) is negative, any relationship could be used. Moreover, frequency-dependant components, such as capacitors, may be used in the feed-back loop, and the decreasing function may then be made to depend either in addition, or alternatively, on either a time-integral and/or a differential of (Vout−Voutref).

For voltages less than the reference voltage, the current 10b is flat, or invariant with voltage, at a nominal first maximum level. In practice, the current need not be flat for voltages lower than the reference voltage; it is sufficient merely that the current is sufficiently high to require that the SMPS provides the maximum desired output current at the regulated output voltage.

Thus according to this arrangement, the gain of the feedback comprising optocoupler is negative, rather than positive according to conventional arrangements. From one viewpoint, then, it may be considered that the feedback, or more accurately of the gain of the feedback, has inverted polarity.

With this arrangement, a demand from the secondary side for more power, that is to say a low value of Vout, results in an increased feedback current. In standby mode, the output voltage Vout is high, which results in a low optocoupler current: this significantly reduces the power consumption in standby mode.

However, this approach gives rise to a significant problem during start-up and in over-current situations. An over-current situation is one in which the current drawn from the converter is larger than the maximum current that can be consistently delivered. Then the part of the desired current that cannot be delivered will discharge the output capacitor of the supply, resulting in a decrease in output voltage—which is equivalent to the output voltage at start-up being low. In start-up and over-current situations, as shown at the left-hand side of FIG. 2, if the output voltage (Vout) is too low to support operation of the optocoupler, both the optocoupler input current and the optocoupler output (feedback) current below the nominal first maximum level. However, the controller would interpret this, that is to say, a low feedback current, as an indication that the voltage is too high, and thus that less power is required. As a consequence, the output voltage will not be able to rise, and start-up will not properly occur.

Figure 3:
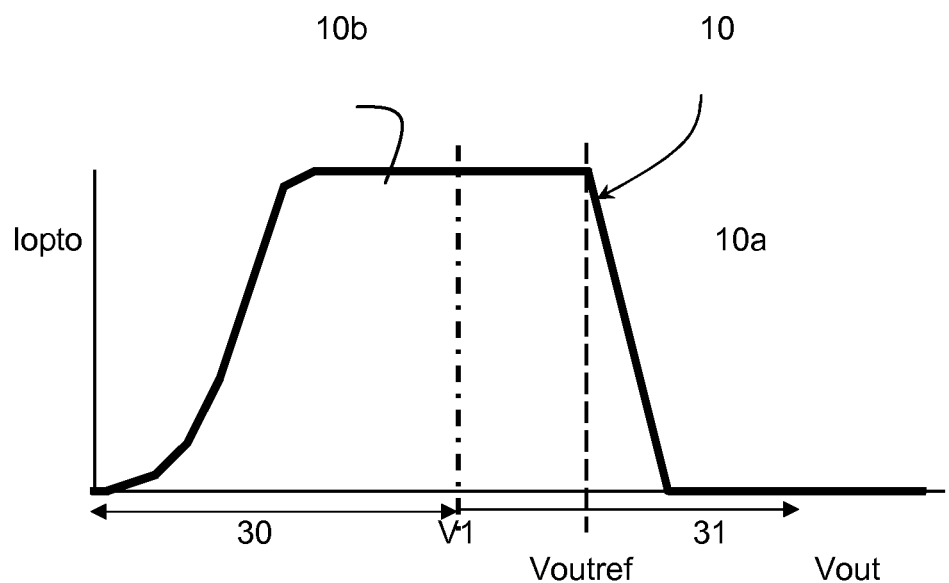
FIG. 3 shows a graph of optocoupler current against output voltage, including under-voltage override according to an embodiment of the invention.

One solution to this problem is to combine the inverted polarity gain as described above with reference to FIG. 2, with a supplementary measurement of the output voltage made on the primary side (Voutprim). When Voutprim indicates that the upper voltage is below a certain threshold level (V1), the inverted polarity gain is overridden. This is illustrated in FIG. 3. The figure shows, as FIG. 2, the feedback current 10 plotted against output voltage. Above a reference voltage (Voutref) the feedback current falls with increasing voltage. However, the controller is only reliant on the feedback current for voltages 31 above a threshold voltage (V1). For voltages 30 below the threshold, the feedback loop is overridden. The threshold voltage is set sufficiently high that the optocoupler is able to operate properly at this voltage. Below the threshold value, the converter operation is fully determined by the primary side control, and can for example be set according to a fixed value of a control parameter such as primary peak current, duty cycle, on-time or frequency, as will be known to those skilled in the art. In other embodiments, the setting for the control parameter is combined with a time-varying element, for example, a slow increase over a certain time interval, in order to provide a soft start, or a value which depends on the rate of rise of Voutprim, that is to say depends on dV/dT, to result in a well-defined output voltage rise during start-up.

Figure 4:
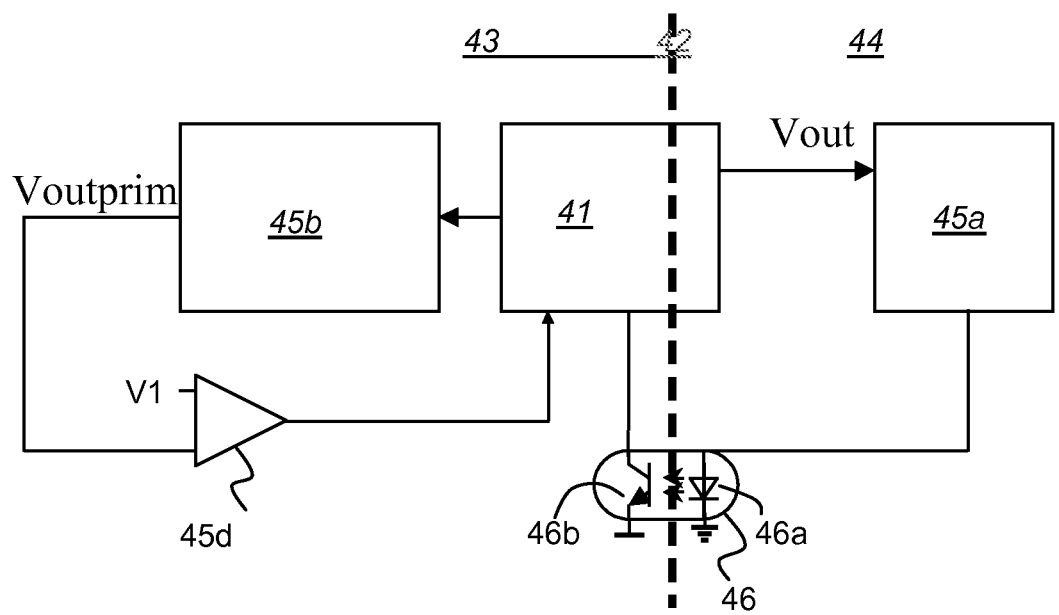
FIG. 4 shows a block diagram of a controller according to an embodiment of the invention.

An SMPS arrangement for using this method is shown in block diagram form in FIG. 4. FIG. 4 shows a power converter 41, which operates across the mains isolation 42 between a primary side 43 and a second recite 44. On the secondary side there is a secondary side control block 45a, which receives as input the output voltage (Vout). The secondary side control block 45a drives the LED 46a of an optocoupler 46. The photo diode 46p of optocoupler 46 feeds this information back to the power converter 41. On the primary side there is the primary side control block 45b, which provides a measurement (Voutprim) indicative of the output voltage, by means which will be immediately apparent to those skilled in the art; for example by means of a primary side auxiliary transform or winding. The measurement (Voutprim) indicative of the output voltage is compared with a threshold voltage V1 in a comparator 45d, and the result is supplied to the converter to determine whether control of the converter is by means of the feedback current, or the measurement (Voutprim) indicative of the output voltage.

Use of the arrangement shown in FIG. 4 could result in an anomalous, or potentially unsafe, situation where the input measurement circuit to determine Voutprim malfunctions—for example, due to a broken or shorted connection in the auxiliary winding circuit. The optocoupler may then be permanently overridden, resulting in an uncontrolled output voltage.

To prevent this, in one embodiment, is there is provided an over-voltage protection at the secondary side, which supplies additional information to the primary side. This additional information may be sent via the optocoupler by applying a current level outside the normal operation range. Thus, if the output voltage exceeds an upper bound, both the inverted polarity feedback and the Voutprim measurement are overridden by the abnormally high current on the optocoupler. Corrective actions, which may be applied when overvoltage is determined, may include a cycle-by-cycle action, wherein the converter is disabled when the level is above the overvoltage threshold but re-enabled when the level falls below this threshold; alternatively a latch may be applied such that the converter is disabled when the level is above the threshold and a safe restart is forced.

Figure 5:
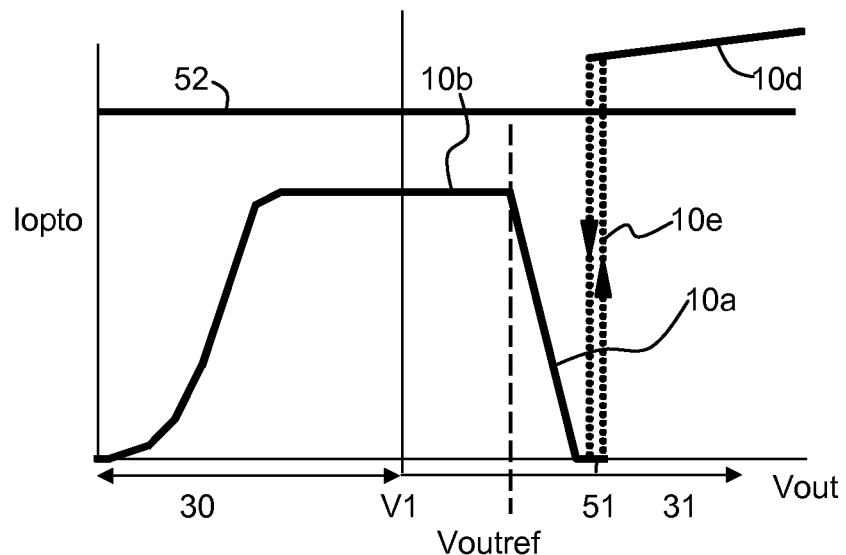
FIG. 5 shows a graph of optocoupler current against output voltage, including under-voltage override and overvoltage protection, according to another embodiment of the invention.

FIG. 5 shows a graph of the feedback current against output voltage according to this embodiment. The plot is similar to that shown in FIG. 3; however in this case, where the output voltage exceeds an upper bound 51, a abnormally high current 10d is driven through the optocoupler's LED 46a. Since this abnormally high current 10d exceeds an overvoltage protection threshold value or upper bound 52, the controller is able to recognize that a malfunction has occurred. As shown, the abnormally high current 10d increases with yet further increase in output voltage, however, the skilled person will appreciate that the current may be invariant with further increases in output voltage, or even fall with such increases. Furthermore, as shown in the figure, there may be included hysteresis 10e around the upper bound 51, in order to prevent bouncing between the normal-voltage, and overvoltage protected, states.

Another way of preventing the anomalous situation would be to provide extra timing information, which checks if the feedback current override takes a longer time than expected or desired, as an indication of a malfunction. If a malfunction is indicated, action can be taken, for instance to disable the converter or disable the Voutprim measurement overriding mechanism.

Figure 6:
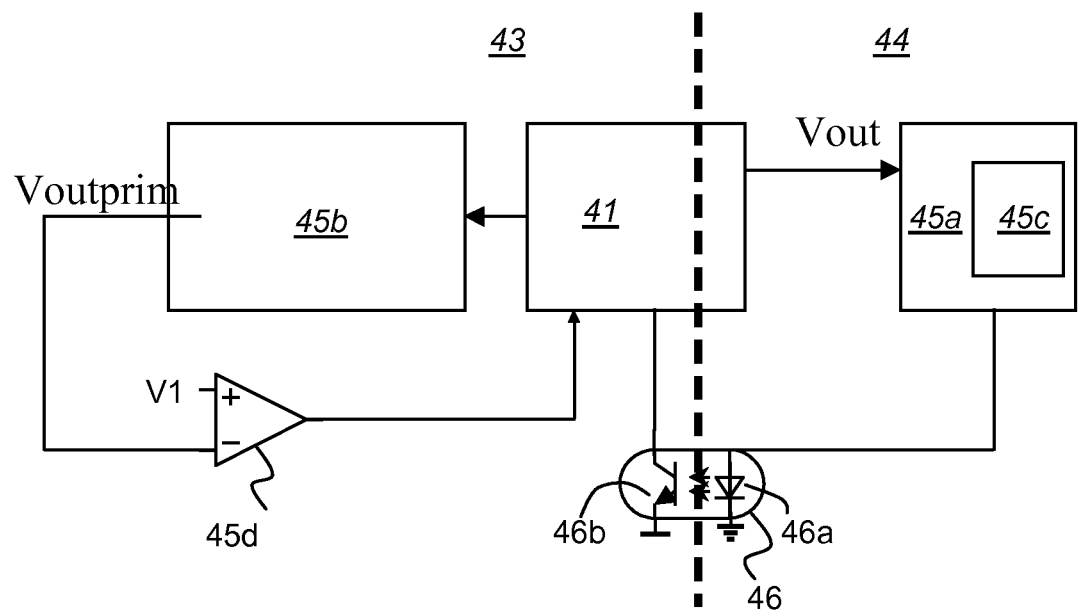
FIG. 6 shows a block diagram of a controller operable according to the graph of FIG. 5.

An arrangement for using the over-voltage protection method is shown in block diagram form in FIG. 6. The figure is substantially the same as that in FIG. 4, and like numerals are used to reference like components; however, in this case the secondary side control block 45a includes an over-voltage protection control element 45c In another embodiment, the potential problem of a low output voltage being insufficient to drive the optocoupler is resolved by use of a minimum current threshold (Ithreshold). In this embodiment, a representation of the output current of the optocoupler is compared with a threshold, in order to define an overriding condition for the optocoupler output. The control of the primary side is defined such that the current corresponding to the minimum required output power is larger than the minimum value of the output current of the optocoupler, thereby ensuring that the output can regulate to a minimum output power. As the overriding condition for the optocoupler output is now based on the optocoupler current, additional (primary side) sensing of output voltage is not necessary: absent any Voutprim measuring circuitry the above anomalous situation where such circuitry malfunctions is precluded.

Figure 7:
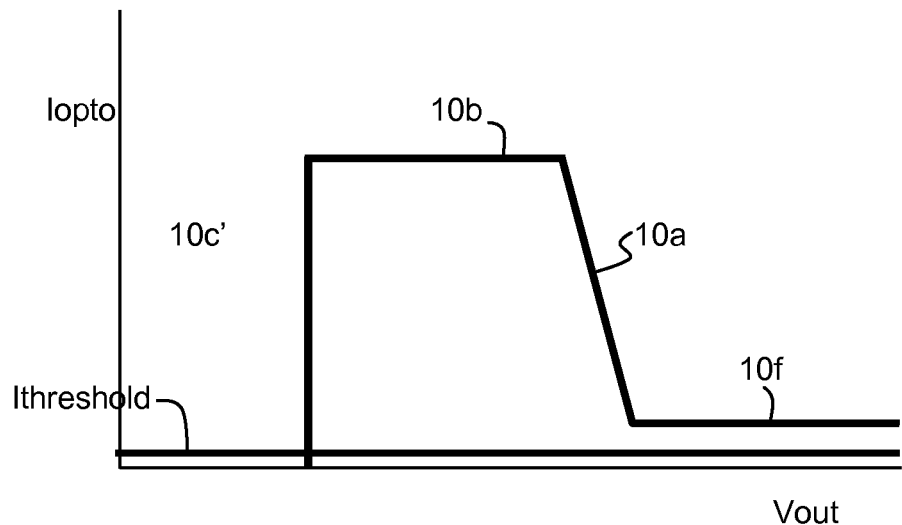
FIG. 7 shows a graph of optocoupler current against output voltage according to a further embodiments of the invention.
Figure 8:
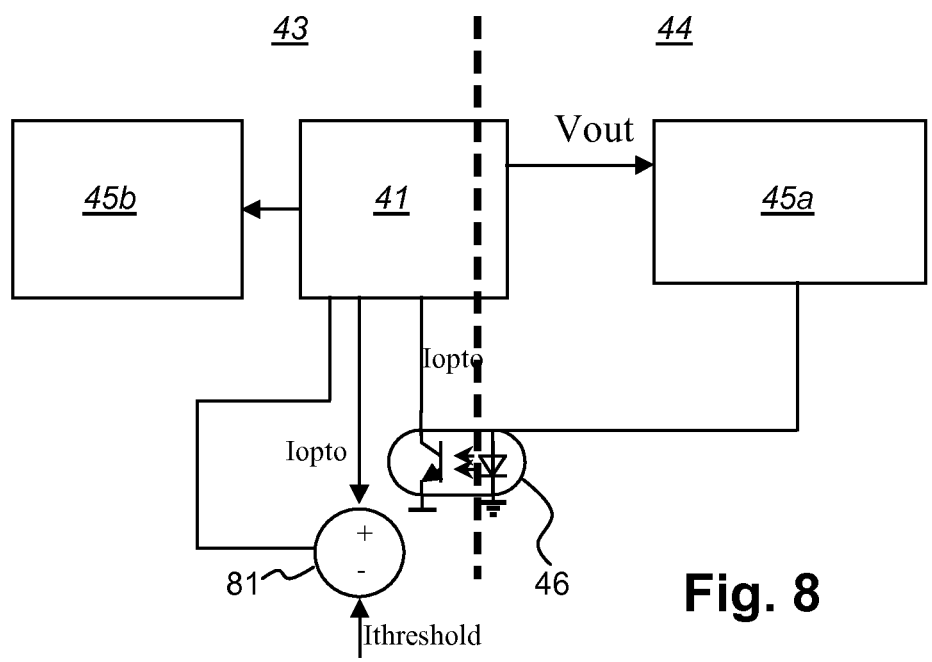
FIG. 8 shows a block diagram of a controller operable according to the graph of FIG. 7.

A graph of the feedback current against output voltage for this embodiment is shown in FIG. 7, and the corresponding block diagram in FIG. 8. In FIG. 7, similar to the previous embodiments, sections 10b and 10a of the feedback current again form a monotonically decreasing function of voltage, with section 10b being a flat and section 10a falling linearly. However, in this embodiment, section 10a does not fall to zero with increasing output voltage, but rather is clamped so as not to be able to fall below a minimum value as shown at 10f under normal Vout conditions. This value is greater than that a predetermined current threshold level (Ithreshold). At low voltages, the current is made to fall sharply at 10c', to zero—typically by switching off the output current from the error amplifier. Since this is less than the threshold currents, the control is able to determine that the converter is operating in a low voltage regime.

The corresponding block diagram in use is shown in FIG. 8. This arrangement is similar to that shown in FIGS. 4 and 6; however, in this case the output current $I_{Opto}$ from the optocoupler is also used to provide an input into a comparator 81. Comparator 81 compares this current ($I_{Opto}$) with the threshold currents (I threshold), and if it is determined that the Opto current is below the threshold, the converter is determined to be in a low voltage mode.

For the sake of completeness and the avoidance of doubt, it is hereby confirmed that a "monotonically decreasing" function is a function which does not increase; that is to say the function can either decrease or remain flat (i.e. neither increase nor decrease), or a combination of decrease and remain flat.

In summary, from one viewpoint, a controller for a Switched Mode Power Supply having opto-coupler-based feedback from secondary to primary side, has been disclosed, in which the optocoupler current varies inversely with the output voltage over a voltage control range. The converter is thereby enabled to consume less power than do conventional converters, when in lower-power standby mode. Also disclosed have been low-voltage startup and over-voltage protection arrangements combined with such a controller. Corresponding methods have been also disclosed.

From reading the present disclosure, other variations and modifications will be apparent to the skilled person. Such variations and modifications may involve equivalent and other features which are already known in the art of power converters, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A controller configured to control a switched mode power converter, the switched mode power converter having a primary side, a secondary side isolated therefrom and for providing an output voltage, and an optocoupler therebetween for providing feedback information to the primary side from the secondary side and drawing a feedback current from the secondary side,
    wherein the feedback information is dependant on the output voltage (Vout) and
    the controller is configured to provide that the feedback current (Iopto) monotonically decreases with increasing output voltage between a threshold voltage (V1) and at least an upper bound,
characterised in that the controller is configured such that the feedback current is invariant with the output voltage between the threshold voltage and a reference voltage (Voutref), which reference voltage is higher than the threshold voltage.

2. A controller according to claim 1, wherein the controller is configured such that the feedback current either is inversely proportional to the output voltage above the reference voltage (Voutref) or decreases linearly with increasing output voltage above the reference voltage (Voutref).

3. A controller according to claim 1, configured to receive a signal (Voutprim) from the primary side indicative of the output voltage (Vout), and wherein the controller is further configured to override the feedback information from the optocoupler with the signal (Voutprim) when the output voltage is less than the threshold voltage.

4. A controller according to claim 3, wherein the controller is configured to provide an over-voltage feedback current (10*d*) in the case that the output voltage is above the upper bound.

5. A controller according to claim 4, further comprising an over-voltage protection control element for triggering the over-voltage feedback current only after a predetermined time has elapsed.

6. A controller according claim 1, wherein the controller is configured to provide a minimum feedback current, in the case that the output voltage is above the upper bound.

7. A controller according to claim 6, wherein the controller is configured to override the feedback information from the optocoupler in the case that the feedback information is less than a predetermined threshold current.

8. A switched mode power converter comprising a controller as claimed in claim 1.

9. A method of controlling a switched mode power converter having a primary side, a secondary side isolated therefrom and for providing an output voltage, and an optocoupler therebetween for providing feedback information and drawing a feedback current from the secondary side,
    the method comprising providing feedback information to the primary side from the secondary side dependant on the output voltage and
    generating the feedback current such that it monotonically decreases with increasing output voltage between a threshold voltage and at least an upper bound,
    and wherein the feedback current is invariant with the output voltage between the threshold voltage and a reference voltage (Voutref).

10. The method of claim 9 wherein the feedback current either varies in inverse proportion to the output voltage above the reference voltage (Voutref) or decreases linearly with increasing output voltage above the reference voltage (Voutref).

11. The method of claim 9, further comprising measuring a signal (Voutprim) on the primary side indicative of the output voltage (Vout), and overriding the feedback information from the optocoupler with the signal in the case that the output voltage is less than the threshold voltage.

12. The method of claim 11 wherein the controller provides an over-voltage feedback current in the case that the output voltage is above the upper bound.

13. The method of claim 12, wherein the over-voltage feedback current is triggered only once the output voltage has been above the upper bound for a predetermined period.

14. The method of claim 9, wherein the feedback current is set to a minimum value (10*f*), in the case that the output voltage is above the upper bound.

15. The method of claim 14, wherein the controller overrides the feedback information from the optocoupler, in the case that the feedback information is less than a predetermined threshold value which is less than the minimum current value (10*f*).

* * * * *